(12) United States Patent
Boutault (10) Patent No.: US 7,319,991 B2
(45) Date of Patent: Jan. 15, 2008

(54) COMPUTERIZED COST ESTIMATE SYSTEM AND METHOD

(75) Inventor: Romuald Boutault, Saint Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 10/308,497

(22) Filed: Dec. 3, 2002

(65) Prior Publication Data

US 2003/0110141 A1   Jun. 12, 2003

(30) Foreign Application Priority Data

Dec. 11, 2001   (EP)   ................... 01480127

(51) Int. Cl.
G06F 17/00 (2006.01)
(52) U.S. Cl. .................................... 705/400
(58) Field of Classification Search ................. 705/400
See application file for complete search history.

(56) References Cited

U.S. PATENT DOCUMENTS

| | | | |
|---|---|---|---|
| 5,999,947 A * | 12/1999 | Zollinger et al. | 707/203 |
| 6,615,404 B1 * | 9/2003 | Garfunkel et al. | 717/173 |
| 6,710,822 B1 * | 3/2004 | Walker et al. | 348/722 |
| 6,922,685 B2 * | 7/2005 | Greene et al. | 707/1 |
| 7,043,457 B1 * | 5/2006 | Hansen | 705/80 |
| 2002/0035511 A1 * | 3/2002 | Haji et al. | 705/26 |
| 2002/0099824 A1 * | 7/2002 | Bender et al. | 709/225 |
| 2002/0184180 A1 * | 12/2002 | Debique et al. | 707/1 |
| 2003/0115163 A1 * | 6/2003 | Moore et al. | 705/500 |

FOREIGN PATENT DOCUMENTS

WO   WO 00/70519   * 11/2000

OTHER PUBLICATIONS

Anonymous,, "Forman Offers Web Database System (Low-Cost Software Lets Users Build Database of Product Information and Convert It into HTML-Based Catalog)," Interactive Age, Jun. 5, 1995, p. 20.*
"Compaq Total Cost of Ownership Overview", 1998-1999.
"EMC Effect Value Justification Tool", Dec. 22, 2000-2001, website http://web.archive.org/web/20010801174855/http://www.emc.com/tco/.
"Network Appliance Cost Analysis Tool", 2001, website http://web.archive.org/web/20010803052058/http://www.netapp.com/tco/.

* cited by examiner

Primary Examiner—Igor N. Borissov
Assistant Examiner—Nathan H. Erb

(57) ABSTRACT

A method and system for computing a cost estimate for a company that may be the client of a supplier providing information system equipment and consulting. An estimate is calculated according to a model with input characterizing circumstances of the client. The program collects client profile information and costs that the client knows. Other costs that the client does not know are read from a local database storing costs known by other clients with similar profiles. A remote database accessible by any client is updated by cost estimate information at each new cost estimate execution by a client.

16 Claims, 10 Drawing Sheets

| Variable name | Variable label | Table | |
|---|---|---|---|
| P1 | Company Name (Id) | 65.0 | - |
| P2 | Industry (Id) | 7.00 | - |
| P3 | Storage architecture (Id) | 56.3 | - |
| P4 | Disk Capacity Managed (TB) | 25.0 | - |
| P5 | Total Revenue (M$) | 1450 | - |
| P6 | Revenue Growth (%) | 12.0 | - |
| I1 | Number of technical employees completely involved in storage (FTE) | 46.4 | V |
| I2 | Number of non-technical employees involved in storage (FTE) | 24.6 | E |
| I3 | Salary of 1 employee (K$) | 35.0 | V |
| I4 | Number of server with internal disk (#) | 1200 | V |
| I5 | Number of server with external disk (#) | 1200 | E |
| I6 | Type of server architecture | 4 | V |
| I7 | Average costs of 1 storage server ($) | 1040 | V |
| I8 | Disk Capacity purchased (TB) | 45.0 | V |
| I9 | Utilization rate (%) | 75.0 | V |
| I10 | Annual Growth (%) | 30.0 | V |
| I11 | Average cost of 1 installed GB ($/GB) |  | E |
| I12 | Number of hours of outage (#) | 550 | E |
| I13 | Hourly cost of a downtime (K$) | 20.0 | E |
| I14 | Number of users (K#) | 15.0 | E |
| I15 | Availability (%) | 98.5 | V |
| I16 | Annual opening hours (h) | 3650 | V |
| TCE1 | Human Resources costs (M$) | 53.4 | - |
| TCE2 | Hardware costs (M$) | 21.6 | - |
| TCE3 | Software costs (M$) | 5.84 | - |
| TCE4 | Outage costs (M$) | 78.3 | - |
| TCE5 | Environmental costs (M$) | 145.0 | - |
| A1 | Release of TCE application | 213 | - |
| A2 | Release of the reference data base (date of last update YYMMDDHHMM) | 0110031043 | - |
| A3 | Date (YYMMDD) of record creation | 011003 | - |

| SCSE in 2000 Storage Cost Estimate | Environment A | Environment B | Environment A + B |
|---|---|---|---|
| Annual SCE | 960 K USD | 240 K USD | 1 200 K USD |
| Monthly SCE per Online Data Capacity | 133 USD/GB/Month (with 600 GB of online-data) | 90 USD/GB/Month (with 200 GB of online-data) | 125 USD/GB/Month (with 800 GB of online-data) |
| Monthly SCE per Purchased Disk Capacity | 50 USD/GB/Month (with 1 600 GB of purchased disk) | 40 USD/GB/Month (with 500 GB of purchased disk) | 48 USD/GB/Month (with 2 100 GB of purchased disk) |

COMPUTERIZED COST ESTIMATE SYSTEM AND METHOD

FIELD OF THE INVENTION

The present invention generally relates to computerized cost estimation of an activity in a business organization; more particularly, the invention relates to a cost estimation method and system using parameter values that take into account the specific circumstances the organization.

BACKGROUND OF THE INVENTION

A service provider or a consulting company may provide a client or a customer with cost estimates used for planning the design or production budget of a business activity. Since important decisions may hinge on analysis supported by such estimates, it is important to ensure that the estimates are as accurate as possible.

The accuracy of a cost estimate depends on the model used to represent the underlying situation. Even when the accuracy of the model itself is not in question, however, the accuracy of the resulting estimate is still dependent upon the choice of input parameter values. For example, a cost estimate for an IT installation at a customer site may include the cost of equipment, the cost of real estate, the cost of operation and maintenance, and the cost of labor.

Often, some of the costs are known by the client from past experience, and some are not. The usual solution is then for the supplier to send a consultant on-site to collect and compute the unknown or missing information. This solution is costly for the client and the supplier.

Programs exist today for computing cost estimates for industry equipment and processes. In the IT industry, one such tool is the Total Cost Of Ownership Snapshot of COMPAQ, which can be downloaded at the Internet address 'compaq.com/tco/snapshottool.html'. Another such tool is the NetApps TCO tool of Network Appliance at the Internet address 'netapp.com/tco/'. Yet another example is the EMC Effect Value Justification Tool sold by EMC company at 'emc.com/tco/'.

Such programs often have graphical user interfaces for interactively capturing parameter values entered on input screens. When a customer does not know a value needed as an input, the program uses a default value, which may be an average value known to industry experts.

The results obtained when using default values are not nearly as accurate as the results obtained when using input information gathered by consultants, however, as an industry-average value may not apply to the customer's particular situation. On the other hand, using default values is significantly less expensive than sending consultants. Consequently, there is a need to preserve the economic advantage offered by cost estimation programs that use default values, but also to provide the accuracy that results when consultants gather missing input information.

SUMMARY

An object of the present invention is to provide a method for automatically computing a cost estimate for operating a given installation corresponding to a given sector of an industry. Another object of the invention is to provide accurate values as input parameters to the method for automatically computing a cost estimate.

These and other objects are achieved by the use of a computerized method for computing a cost estimate that implements a defined cost estimate model corresponding to a user activity and employing input information concerning the particular user. The method comprises the steps of:
 collecting user profile information about a user;
 collecting a first set of costs known by the user;
 reading, from a database, a second set of costs unknown by the user but known by other users who have profiles similar to the user's profile; and,
 calculating the cost estimate using the first set of costs, which are known to the user, and the second set of costs, which are read from the database.

The method for reading the unknown costs from the database includes the steps of:
 for each cost unknown by the user, computing a mathematical distance between the user's profile information and profile information concerning other users read from the database; and,
 selecting the cost associated with the other user having the smallest computed mathematical distance.

Another embodiment includes the use of a relational database wherein a query language provides a query for records that contain the cost unknown by the user but known by other users having profile information closest to the user's profile information.

The invention also includes a method that comprises the steps of:
 sending a message comprising user profile information and the first set of costs to a remote server for use in computing other user cost estimates; and,
 receiving from the remote server a new level of database content updated with information contained in the message, and updating the database connected to the computer with the new database content level.

The invention also includes a computer program comprising instructions executing the steps of the method and a system adapted for carrying out the steps of the method.

The invention also includes a method operating on a server communicating with a computer, comprising the steps of: receiving, from the computer, the message comprising the user profile information and the first set of costs; updating a database connected to the remote server with the message, creating a new level of database content; and downloading the new level of database to the computer.

A characteristic of the invention is to use a reference database comprising only validated values. A validation is first performed by the client, who decides whether or not to send his cost estimate record to the reference database. A second validation is performed at the server level to check coherence between all the inputs provided by the client when executing the cost estimate program. Finally, an input value in the reference database is marked as 'validated' only if it comes from real figures that a client enters as known input. A value that comes from the default found in the database is marked as 'estimated'. With the method of the present invention, only validated values are used for cost estimate computations, in order to provide optimum accuracy. Accuracy is improved at each new update of the reference database, as data from previous cost estimate executions is stored in the database for future use as defaults. In other words, the database is enriched by each run of a cost estimate computation.

As described later with reference to FIG. 3, another embodiment of the invention introduces granularity into the quality of the input value stored in a record of the database by introducing an index of confidence attached to this 'validated' or 'estimated' value. When an associated index value is high, a value may be selected by the cost estimate program as a default value for a missing input even though the value is marked as 'estimated.' The index of confidence is set during the step of coherence checking performed automatically by the remote server in a preferred embodiment.

Another advantage of the invention is flexibility with regard to cost. It is possible to have very-low-cost embodiments of the present invention that provide significantly improved accuracy. It is possible to access the most similar record in the database by computing a mathematical distance between objects stored in a simple file. Another solution, more expensive, is to use a relational database, which is easier to manage, where accessing specific records on the basis of similar attribute values is done via a simple request in the database language.

DETAILED DESCRIPTION

Figure 1:
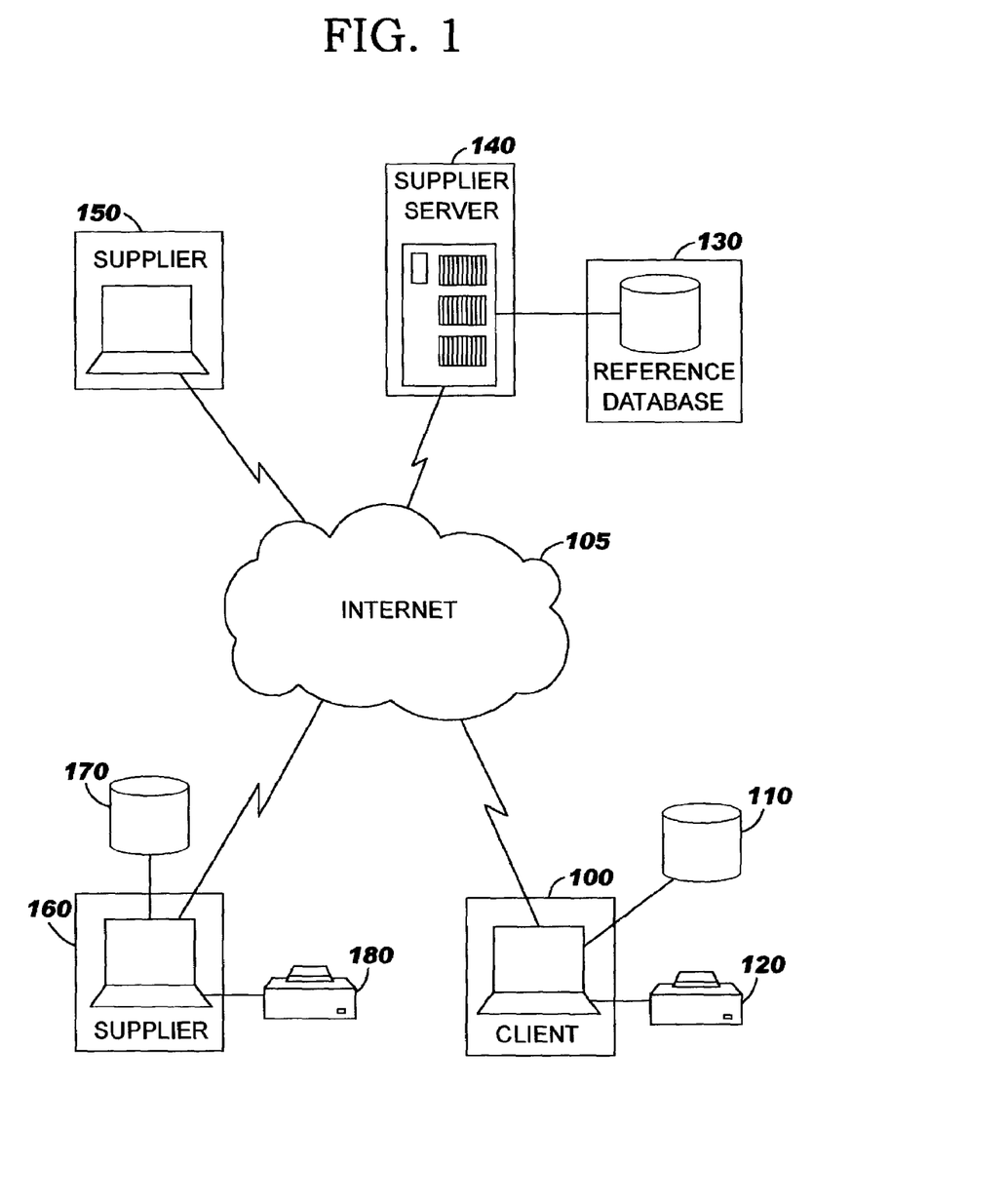
FIG. 1 illustrates an exemplary system suitable for operating a preferred embodiment of the inventive method.

FIG. 1 illustrates an exemplary system suitable for operating the method according to a preferred embodiment of the invention. In this exemplary embodiment, the system comprises a client workstation (100) executing a program using a Graphical User Interface developed on top of an operating system such as Microsoft Windows. The program may also use the services of other utilities such as a spreadsheet for calculation, a word processor for creating and editing documents, a presentation utility for creating screens, an electronic mail utility, and the like.

The cost estimate result is stored in the workstation as a file comprising the inputs provided by the client and the resulting cost computation. The cost estimate result can be locally processed, and displayed or printed on the local printer (120) of the client workstation. The workstation, when executing the cost estimate program, accesses a local database (110) which is, in a preferred embodiment, a replication of a remote database accessed on the workstation via the Internet (105).

The remote database, the reference database (130), is connected to a server (140) owned by the supplier and accessed by the supplier from a remote location (150) for maintenance purposes. The server (140) makes the reference database (130) accessible to the supplier's client cost estimate tool for replication to the local database (110). The server (140) executes a program to control and allow access to the reference database (130) to well-identified client cost estimate programs. The reference database (130) is also updated by each new cost estimate execution. This update is controlled by the supplier from his workstation (150) or, in another embodiment, automatically by a program executing on the server (140).

The supplier may also remotely execute a cost estimate for a client, for example during the negotiation or execution of a contract. The supplier uses the same program execution environment (160, 170, 180) that the client uses to execute a cost estimate.

Figure 2:
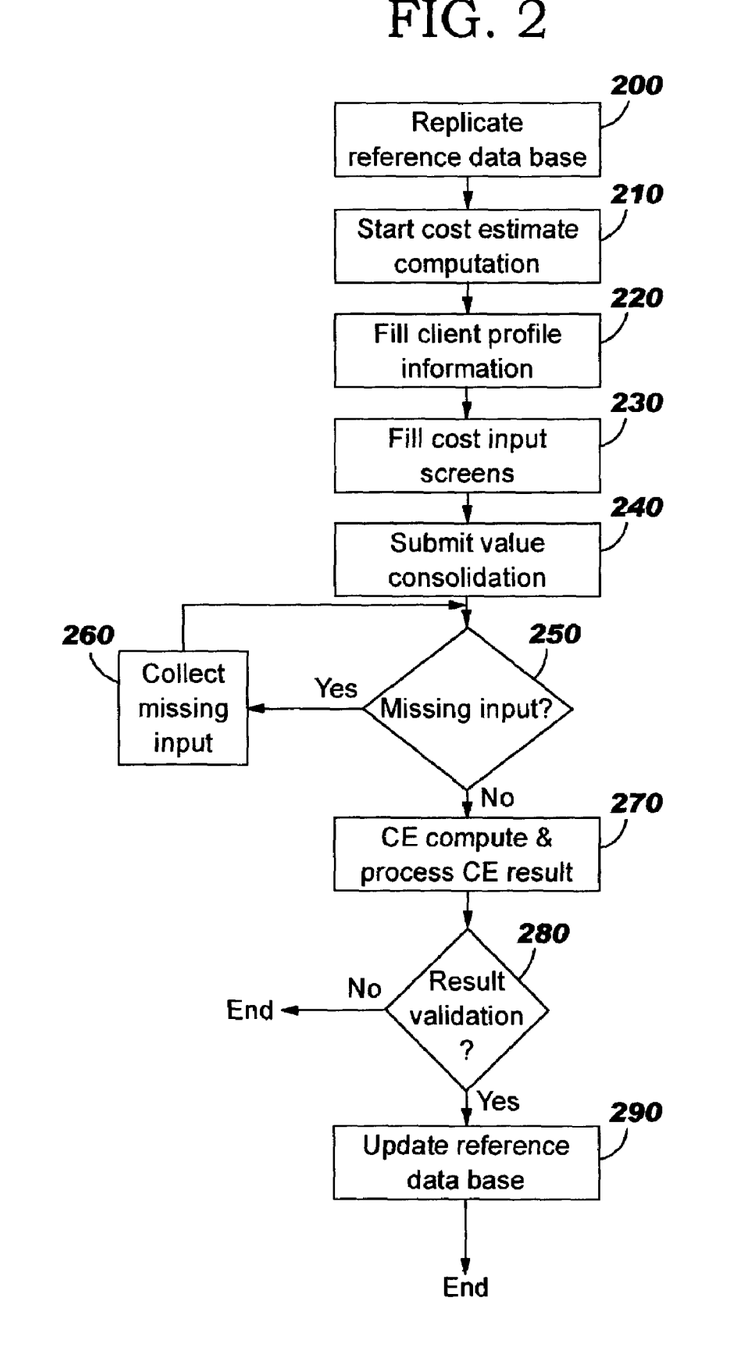
FIG. 2 is the general flowchart of the cost estimate application.

FIG. 2 is a general flowchart of the cost estimate computation according to a preferred embodiment of the invention. The first step (200) is to start replication of the reference database (130). When the cost estimate application is started, the client can optionally request a replication of the reference database (130) in order to use the latest version. The client is encouraged to update his database by receiving a reminder when a new version of the database has been created.

If the client (100) activates this operation, and this is a preferable option, the application automatically sends an e-mail to the server (140). The e-mail carries an attachment that includes the data needed such as the objective of the request, a return e-mail address for the answer, the current level/release of the replicated database, and so forth. After receiving the e-mail, the server automatically executes the request. If the request cannot be processed, for example if no new version is available, a required fee has expired, and the like, the server sends an e-mail to the client to explain the situation. Otherwise (i.e., the request can be processed), the server automatically sends an e-mail to the client with the new update file (not the full version) of the reference database in an attachment that may be compressed and secured by a password.

After receiving and opening the e-mail, the client detaches the attached file, puts the detached file into a local disk folder, and restarts the application. After the restart, the application automatically senses that a new update of the database is available in the local disk folder. The application then executes the file to complete the replication. Although this step is required, it may be executed independently of the cost estimate execution, since the operation may take some time, depending on the size of the reference database and the network availability. Another embodiment of the invention with higher program-development cost executes automatic replication of the database, without any action of the client, when the customer provides profile and cost input to the application.

Once the local database contains updated information, the cost estimate computation program may be started (210) on the client computer. The program displays screens for capturing input information. A first set of screens is for collecting client information (220) such as the company name, the industry sector, and the total revenue, as described later with reference to FIG. 3. These first inputs constitute the client 'profile'.

The second set of screens is for collecting cost information (230). The inputs collected for computing a cost estimate of an IT installation include hardware and software costs, maintenance costs, and other detailed inventory costs as described later with reference to FIG. 3. Some input values may be unknown by the customer because he has no experiential way to obtain the values. On the other hand, other inputs may be known very well. As would be known to a person skilled in the art, the program for collecting input may include validation checking for each input field of the screen. This checking may be limited, for example, to acceptance of numerical values only, or to a particular range of numerical values.

After having entered the cost inputs, the client submits these inputs for consolidation, preferably by activating a 'button' of the interactive cost estimate program (240). The input value consolidation step is performed automatically by the cost estimate program, and includes reading all the inputs entered by the client. When a value has not been entered by the client (answer Yes to test 250), the programs looks for a default value in the local database (260). A 'default value' is a value provided by another client who has the profile most similar to the current client's profile. A method for finding a missing value is described in reference to FIG. 5. There are many embodiments for finding the record corresponding to the client having the most similar profile in the database. A preferred embodiment is described later with reference to FIG. 9 and FIG. 10.

When all the inputs are collected (answer No to test 250), the client submits the inputs to the cost estimate run. The cost estimate is automatically computed (270). The cost estimate result is stored in the computer and is displayed, printed, or further processed by the client. The client may validate (answer Y to test 280) the cost estimate just executed if he is confident of the inputs and believes that the result is realistic. The cost estimate inputs and the result are sent through the Internet to the server (140) handling the reference database (130) as a file attached to an e-mail automatically generated by the cost estimate program (290).

Figure 3:
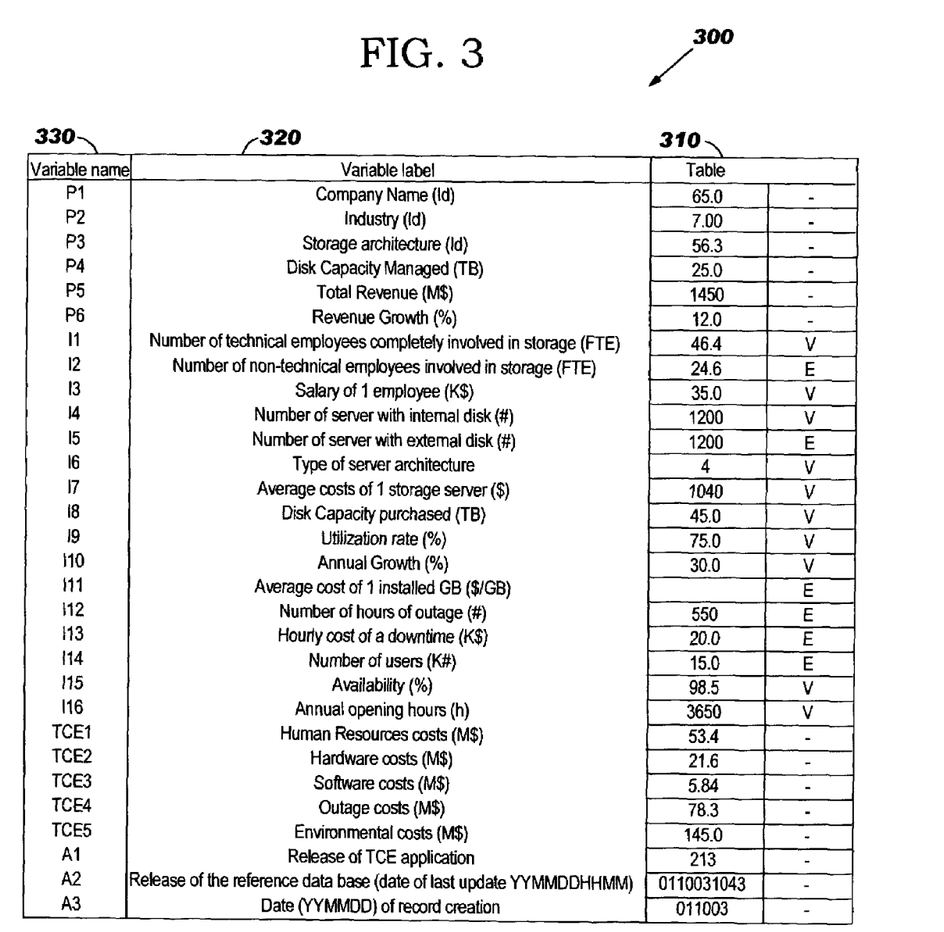
FIG. 3 illustrates a record of the reference database.

FIG. 3 shows an example of information 300 provided by the cost estimate application for storage in the reference database (130) according to a preferred embodiment of the invention. More particularly, the content is illustrated by the content of the right column 310, 'table'. The first part of the information comprises the set of inputs collected by the cost estimate application. Each input is qualified by the 'Variable label' in the center column 320 of FIG. 3. This is the label describing the input. The left column 330 of FIG. 3 contains the 'Variable Name' as used by the programs of the cost estimate application. A variable name is mentioned for each input. The variable values for the record are set in the left column 330 of the 'Table'.

The first six variables of FIG. 3, which have variable names P1 to P6, constitute the client profile. This information is collected by the cost estimate program through the graphical user interface of the operating system of the client workstation. The exemplary input shown in FIG. 3 is for evaluating the cost estimate of a computer storage installation. Two clients having similar profiles are likely to have similar costs. The cost inputs are the next 16 inputs of the column (I1 to I16); they are also collected by the cost estimate program.

The right column 310 of FIG. 3 is itself a two column table, the first column being for the input values, and the second column comprising two letters, either 'V' for 'validated input' or 'E' for 'estimated input'. When a customer has entered an input value (step 230 of FIG. 2) and validated it (step 240 of FIG. 2), the cost estimate program will mark it as 'validated'. If the input value comes from a cost estimate program estimation (steps 260 and 264 of FIG. 2), the cost estimate program will mark it as 'estimated'. In a preferred embodiment of the invention, an input value in a cost estimate record of the database is marked as 'validated' if it is known by the client who entered it during a cost estimate execution. An input value in a cost estimate record of the database is marked as 'estimated' if it has been read from the database at execution of the cost estimate calculation. Then, when the cost estimate program chooses a value from the database for a missing input, it will preferably select only the input values marked as 'validated'.

In another embodiment, a 'confidence index' is applied to a validated or an estimated input value. This confidence index is entered during the step of record validation (290) executed in the remote server (140). When the cost estimate program executing on the client workstation reads the database to find a missing input value, it preferably chooses a record having an 'estimated' input value only if the confidence index is sufficiently high. This embodiment introduces a granularity in the quality of input values stored in the database.

Each set of inputs, as described in FIG. 3, once validated by the client (step 280 of FIG. 2), can be sent simultaneously with the cost estimate result to update the reference database (130). A client update of the database will comprise a part of this set of input values.

As described later with reference to FIG. 5, when the cost estimate program searches the database for a value to use for a missing input, it finds the set of inputs corresponding to a client who has the closest profile, and takes the associated input value only if it is marked 'validated' in the database record. The input values marked 'estimated' are preferably not taken, in order to ensure the quality of the data stored in the reference database (130) which is later used to compute other cost estimates.

Figure 6:
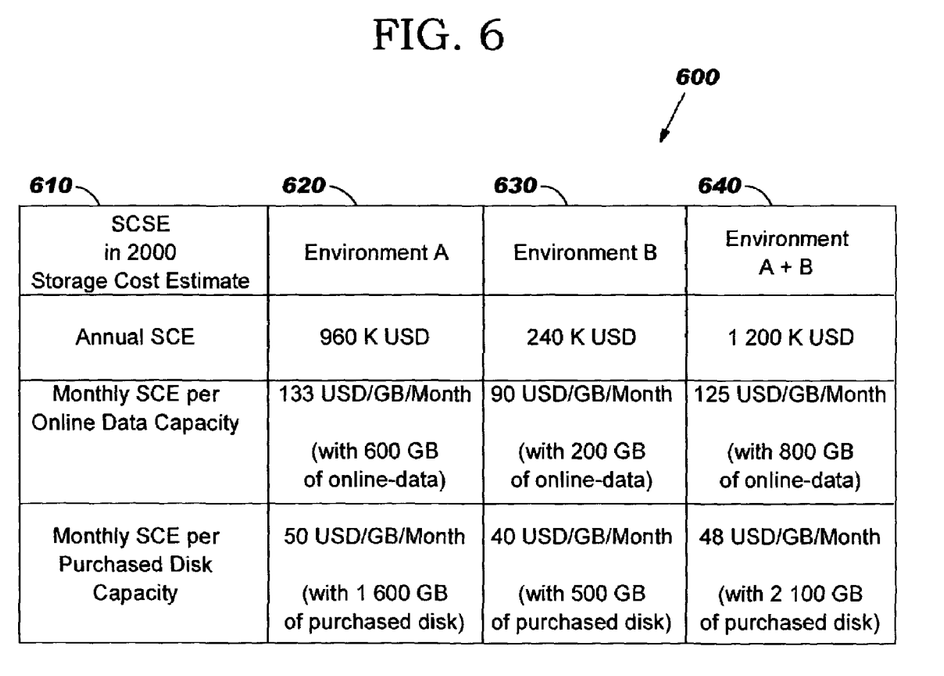
FIG. 6 is an example of the result of a cost estimate.
Figure 7:
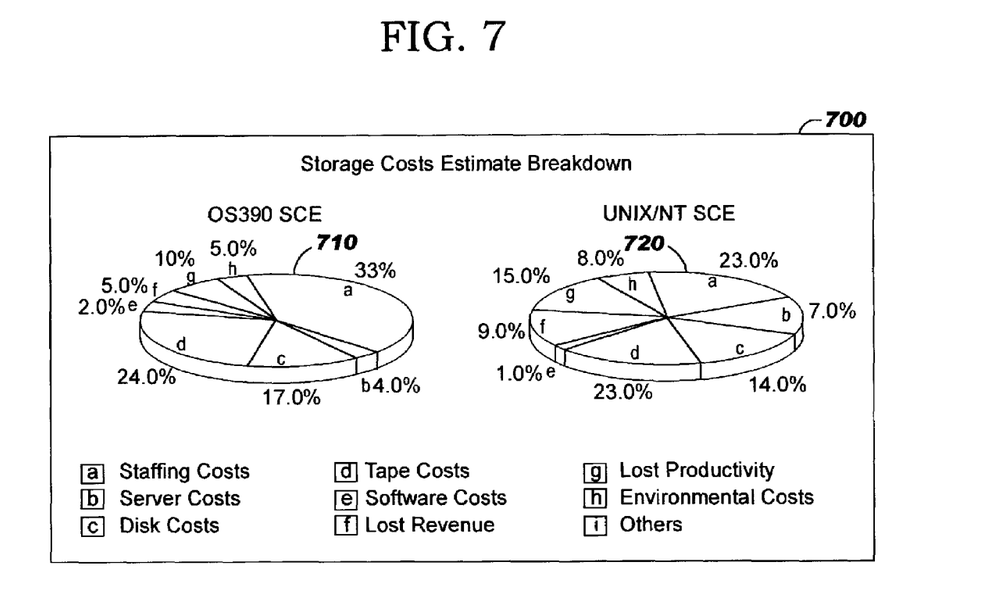
FIG. 7 is a print view of the result of a cost estimate.
Figure 8:
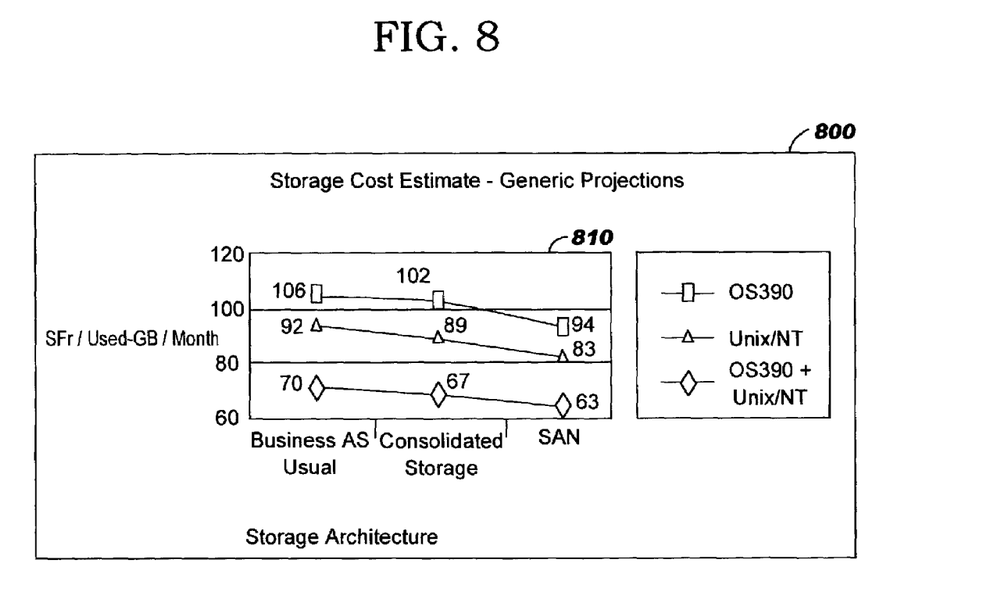
FIG. 8 is a second example of the result of a cost estimate.

The columns of FIG. 3 also contain the cost estimate results for which the variable name (left column 330) are TCE1 to TCE5. These variable values are computed at the end of the cost estimate execution. The client processes this data as illustrated in FIG. 6 through FIG. 8.

The last lines of the columns of FIG. 3 comprise data that are also stored in the database record for administrative purposes. The variables A1, A2 and A3 are used by the program for updating the reference data. These variables are used also by conventional maintenance programs for maintaining the reference database (130) executed on the remote server (140). They include, in a preferred embodiment, the release of the cost estimate application identifying the software level of the application executed by the client on his workstation. A second variable used for administration is the date of the last update of the reference database used by the client when executing the cost estimate application. The third variable is the date of cost estimate execution. These variable for administration are entered automatically by the cost estimate application in the record which is prepared to be sent to the remote server and which is a candidate for being partly stored in the reference database (130) according to the process described below with reference to FIG. 4. Also, the supplier's administrative staff may use the information for maintenance purposes, to support statistical analysis, and to cancel records that are too old.

Figure 4:
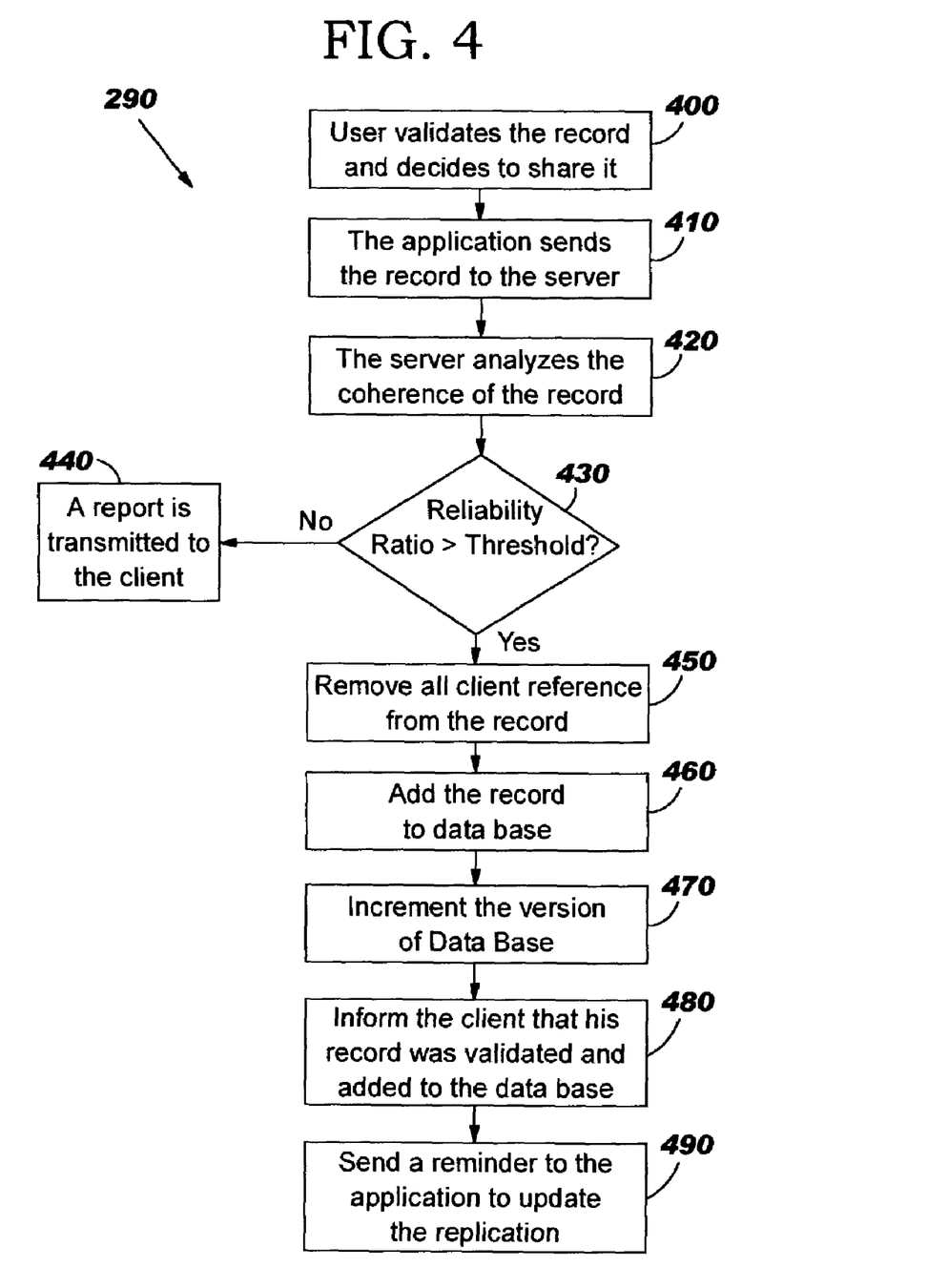
FIG. 4 is a detailed flowchart of the general flow chart of FIG. 2 for the update of the reference database.

FIG. 4 shows a detailed flowchart of a method for updating the reference database (130) with a new execution of a client cost estimate. The client validates the record and decides to share it with the community (290,400). The application automatically sends an e-mail to the server with an attachment (410) containing the application information as described earlier with reference to FIG. 3 and the cost estimate result figures. For security reasons, the attached file may be compressed and secured by a password. The server automatically detaches the information and qualifies its reliability by following a quality process (420). All values are tested to determine whether they conform to a detailed list of constraints. The constraints apply both to the input values collected during the execution of the cost estimate computation and also to the cost estimate result (for example, range, format, comparison/coherence between values, minimum number of known or 'validated' inputs, coherence with other records with the closest profile, and others). At the end of the test, a reliability ratio (0% to 100%) is established. If the reliability ratio does not reach a predetermined threshold (answer No to 430), an e-mail may be sent to the client to explain the reasons of the refusal (440) and to provide advice on how to improve the coherence of the provided inputs.

If the reliability ratio reaches the threshold (Answer yes to 430), the record is automatically appended to the database as a new record. Then, the record is sanitized to delete all client references (450). Because the information may be confidential between the client and the customer, the personal client information is not shared with other clients and thus is not stored in the reference database in a way that makes it accessible to other clients. This measure is not intended to prevent the supplier's administrative people from collecting statistics or other parallel archiving of the client information. The 'sanitized' record is appended to the database (460) and the version of the database is incremented (470). An e-mail is sent to notify the client that the record has been validated and appended to the database (480). A reminder is sent to all installed applications to request an update of the database (490).

Figure 5:
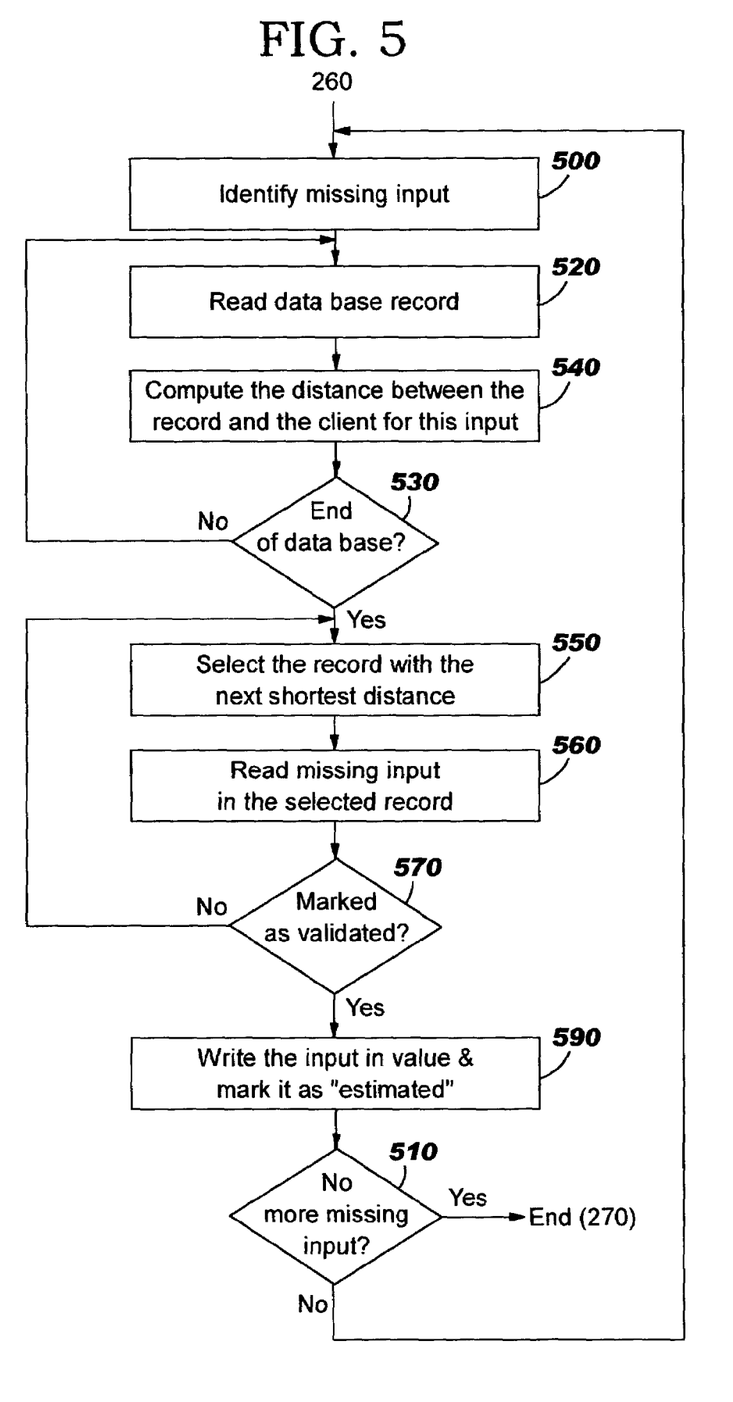
FIG. 5 is a detailed flowchart of the general flowchart of FIG. 2 for the collection of missing values among the input that the client provides.

FIG. 5 shows further details of the general flowchart of FIG. 2 for the collection of missing values among the inputs that the client is asked to provide. This flowchart describes the step of collecting missing input (260 of FIG. 2) in the general method of computing the cost estimate. The process of FIG. 5 starts when at least one input is missing (answer Yes to test 250 in FIG. 2) in the series of inputs the client is asked to provide through the screens of the cost estimate application. When an input value is missing, the application gets the value from the local database (110). The first missing input is first identified (500). A first database record is read (520) and the profile of the client and the profile read in the record are compared. In a preferred embodiment, a mathematical distance is calculated (540) between the two profiles expressed as vectors as explained further below with reference to FIG. 9 and FIG. 10. The mathematical distance uses input values weighted with factors depending on the input. If all the database records have not been read in the database (answer No to test 530), the next database record is read (520) and the distance is computed (540).

When all the database records have been read (answer No to test 530), and all the distances have been calculated and compared, the record in the database corresponding to the minimum distance is selected (550). The record corresponding to a client having the closest profile to the client currently executing the cost estimate application has thus been selected. In the selected record, the input value corresponding to the missing input previously identified (500) is read. As described with reference to FIG. 3, this input may be marked as 'estimated' or 'validated'. If it is marked as 'validated' (answer Yes to test 570), this value is kept for the use of the current execution of the cost estimate, and written in the current input values and marked as 'estimated'. This means that the value has not been computed and validated by the client, but instead is of outside origin. When the missing input value is not found in the selected database record, another candidate is found. This can be a validated value found in a database record for which the mathematical profile distance to the current client record is close to the minimum, although not actually the minimum. A greatest acceptable profile distance between the minimum and the candidate may be defined in the cost estimate program. In practice, a validated value is nearly always found in a record for which the mathematical distance is very close. The more the database is enriched, the greater is the likelihood of finding a good candidate. The selected candidate is marked also as 'estimated' (590) in the input values of the client executing the cost estimate application. As long as there are still missing values to be found by the cost estimate application, the next missing input is identified (500) and the process is repeated. When there are no more missing values to be found (answer yes to test 510), the process ends (END) by returning to step 270 in the general flowchart of FIG. 2.

FIG. 6, FIG. 7, and FIG. 8 illustrate a cost estimate computation applied to an IT installation for a client comprising storage equipment and management. FIG. 6 is a print view (600) of the result of a cost estimate computed according to a preferred embodiment. The current cost estimate model calculates the storage cost estimate 610 (SEC) of a specific storage solution. The table illustrates the results of several cost estimate calculations (Environment A 620, B 630, and their combination 640), displaying the results using different units (annual costs, monthly cost per type of hardware, etc). This table is used to help the client to analyze the results in many ways to facilitate comparisons and benchmarking.

FIG. 7 is a print view 700 of the result of a cost estimate computed according to a preferred embodiment. The current cost estimate model calculates the storage cost estimate (SCE) of a specific storage solution. Each pie chart 710, 720 illustrates the result of the cost estimate calculation, displaying the associated breakdown of the cost categories (cost and percentage for staffing, server, disk, etc.). These graphics help the client determine the highest cost area and prioritize the cost category for cost reduction purposes.

FIG. 8 is a print view 800 of the result of a cost estimate computed according to a preferred embodiment. The current cost estimate model calculates the storage cost estimate (SCE) of a specific storage solution. The graph line chart 810 illustrates the evolution of the cost estimate results according to different IT architectures (business as usual, consolidated storage, storage area network, etc.). The graphic 810 is used to help the client identify an IT architecture which will provide higher potential cost savings.

Figure 9:
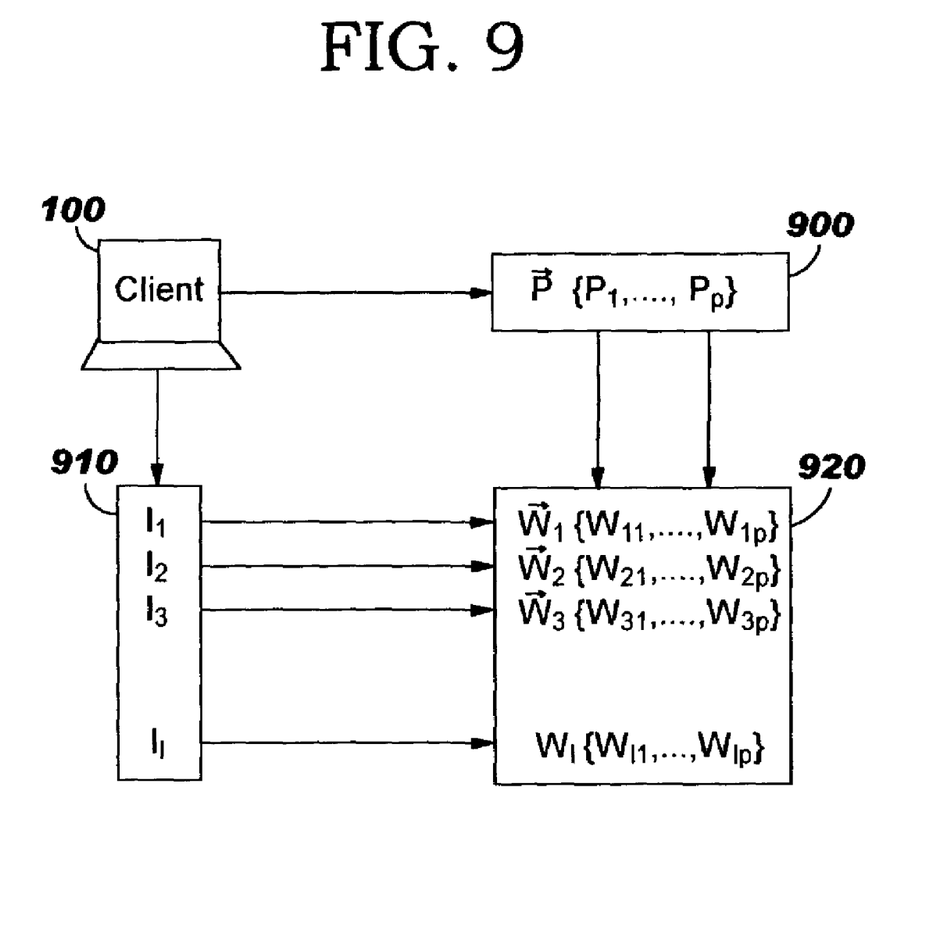
FIG. 9 shows the variables allowing a mathematical distance calculation to find a record in the data base.

FIG. 9 illustrates a vector representation for the mathematical computation of the distance between two records in the reference database. This is an inexpensive embodiment of the method of the invention because the database used can be a simple file under any operating system such as a folder under Microsoft Windows. Another solution, more expensive, includes using a relational database such as IBM DB2. Such databases have query languages to directly search and access records on the basis of field values. Boolean operators can be used. The maintenance of such databases is also facilitated. This solution is recommended when the number of clients reading and updating the database is large. This implies that the local database replications are also of the same kind, and that the operating system of the client workstations can support these databases. Another solution is to have multiple simple (non-relational) databases, each dedicated to a set of customers operating a specific cost estimate. In the IT environment, one database could be dedicated to storage costs and another to the network and communications.

FIG. 9 shows variables (900, 910, 920) for distance calculation. These variables may be part of the execution context of the program. A first p-dimensional vector (900)

representing the client profile is created by the cost estimate application executed on the client workstation (100). The p dimensions are the p input values constituting the client profile. In the example of FIG. 3, the p vector coordinates are the first six input values, which are numeric values, of the variable list. An 'input table' is also created (910), which comprises i elements corresponding to the cost input values requested by the cost estimate application. In the example of FIG. 3, there are 18 cost input variables used by the corresponding cost estimate application. Each input j (j is an integer from 1 to i) of the input table is associated with a 'weight factor', $W_j$. The weight factor characterizes the use of the profile inputs for this specific cost input. Then the distance between two elements of the database may be computed as follows.

For the record having ID #65, for example, we compute, according to step 540 of FIG. 5, the distance between this record and the client record for the cost input $I_3$, which is the missing input identified in step 500 of FIG. 5. The profile vector for the #65 record when applied to cost input $I_3$ is:

Profile Vector $(65,I_3) = W_{3,1} \cdot P_{65,1} + \ldots + W_{3,p} \cdot P_{65,p}$ The profile vector for the other records (Id) is:

Profile Vector $(Id,I_3) = W_{3,1} \cdot P_{id,1} + \ldots + W_{3,p} \cdot P_{id,p}$ The distance is the absolute value of the vector difference:

Profile Vector $(65,I_3)$ – Profile Vector $(Id,I_3) = W_{3,1}(P_{65,1} - P_{id,1}) + \ldots + W_{3,p}(P_{6,5,p} - P_{1,d,p})$ The program selects the record with the minimum distance (550). This means that a search for the smallest value of the following expression is performed for all the record Ids in the data base:

|Profile Vector $(65,I_3)$ – Profile Vector $(Id,I_3)$|

The record Id $(Id_{mini})$ for which the distance is minimum satisfies the following inequalities:

|Profile Vector $(65,I_3)$ – Profile Vector $(Id_{mini},I_3)$|
$\leq$ {Profile Vector $(65,I_3)$ – Profile Vector $(Id,I_3)$}

Once the record Id has been identified, the value of the missing input can be read according to the next step (560) of the method.

Figure 10:
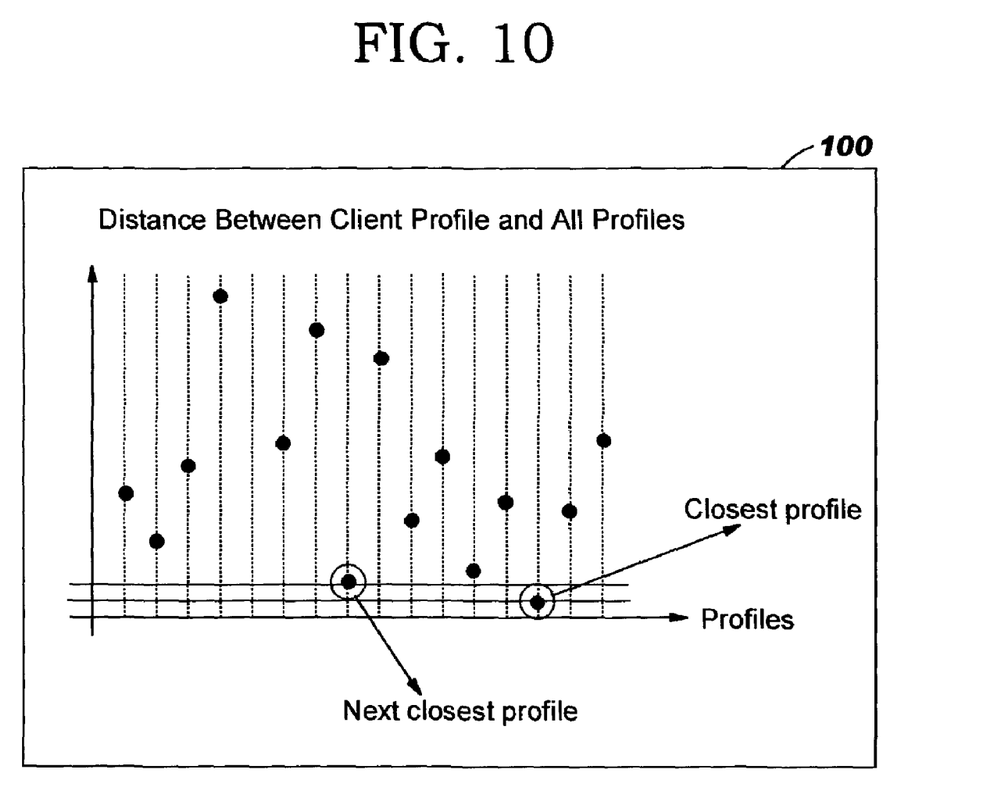
FIG. 10 illustrates the selection of records in the database according to the value of their mathematical distances to the vector representing the client profile.

FIG. 10 illustrates the selection of records in the database according to the value of their mathematical distances 1000 to the vector representing the client profile.

I claim:

1. A computerized method for computing a cost estimate, said method comprising the steps of: collecting user profile information concerning a user; collecting a first set of costs known by said user; reading from database records of a local database that include profile information concerning previous users and that include a second set of costs unknown by said user and known by the previous users, the second set of costs having been uploaded by the previous users after calculating cost estimates using the computerized method, wherein the previous users have profile information similar to the collected user profile information; calculating the cost estimate using the first set of costs and the second set of costs; displaying the calculated cost estimate; and after calculating the cost estimate using the computerized method, sending, to a reference database, a message comprising the collected user profile information concerning the user and the first set of costs known by the user to enable updating of the local database for future users.

2. The method of claim 1, wherein the step of reading comprises the steps of: computing, for each cost unknown by said user, a mathematical distance between the collected user profile information and the profile information in each database record read; and selecting a database record having minimum computed mathematical distance.

3. The method of claim 2, wherein the mathematical distance is a vector distance with coordinates dependent upon the collected user profile information, said vector distance being weighted according to cost.

4. The method of claim 1, wherein the local database is a relational database having a query language, and wherein the step of reading comprises a step of performing a query to find records in the local database that include a cost unknown by said user and known by at least one of the previous users, and include profile information closest to the collected user profile information.

5. The method of claim 1 further comprising, before the step of sending, a step of marking as 'known' in the message cost information which has been collected, and marking as 'unknown' cost information which has been read from the local database.

6. The method of claim 1, wherein the step of sending is performed upon a request entered by an operator of a computer calculating a user cost estimate.

7. The method of claim 1, wherein the message further comprises a result of the cost estimate calculating step and the second set of costs.

8. The method of claim 1, wherein the message further comprises administrative information including an identification of cost estimate calculation step execution and an identification of a level of the local database read for the cost estimate calculation step.

9. The method of claim 1, further including the step of replicating the local database from the reference database.

10. The method of claim 1, wherein said steps of collecting user profile information, collecting a first set of costs, reading from database records, calculating a cost estimate, displaying the calculated cost estimate, and sending a message are performed by a computer, said computer in communication with a remote server, said remote server performing the steps of: receiving, from the computer, the message comprising the collected user profile information and the first set of costs; updating, according to information included in the message, the reference database to create a new level of database content; and downloading the new level of database content to the computer.

11. The method of claim 10, wherein the step of downloading is performed upon a request entered by an operator of the remote server.

12. The method of claim 10, further comprising, before the step of updating, the remote server performing a step of removing user identity information from the collected user profile information included in the message.

13. The method of claim 10, further comprising, before the step of updating, the remote server performing the steps of: reading, from the message, the collected user profile information, the second set of costs, and a result of the cost estimate calculating step; and automatically checking coherence between the result of the cost estimate calculating step and the collected user profile information according to pre-established business rules.

14. The method of claim 10, further comprising, after the step of downloading, the remote sever performing the steps of: reading, from the message, administrative information including an identification of a cost estimate calculation step execution and an identification of the database level read for the cost estimate calculation step execution; and archiving the content of the message in a database connected to the remote server.

15. A computer program for computing a cost estimate, the computer program stored on a computer readable medium, comprising: a collecting code segment that collects user profile information concerning a user and a first set of costs known by the user; a reading code segment that reads from database records of a local database that include profile information concerning previous users and a second set of costs unknown by said user and known by the previous users, the second set of costs having been uploaded by the previous users after calculating cost estimates using the computer program, wherein the previous users have profile information similar to the collected user profile information; a cost estimate calculator code segment that calculates the cost estimate using the first set of costs and the second set of costs; a display code segment that displays calculated cost estimates; and a transmitting code segment that transmits the collected user profile information concerning the user and the first set of costs known by the user to enable updating of the local database for future users of the computer program.

16. A computer readable medium storing a computer program for computing a cost estimate, comprising: a collecting code segment that collects user profile information concerning a user and a first set of costs known by the user; a reading code segment that reads from database records including profile information concerning previous users and a second set of costs unknown by said user and known by the previous users, the second set of costs having been updated by the previous users after calculating cost estimates using the computer program, wherein the previous users have profile information similar to the collected user profile information; a cost estimate calculator code segment that calculates the cost estimate using the first set of costs and the second set of costs; a display code segment that displays calculated cost estimates; a transmitting code segment that transmits the collected user profile information concerning the user and the first set of costs known by the user; a receiving code segment that receives the collected user profile information concerning the user and the first set of costs known by the user; an updating code segment that updates, according to the transmitted information, the database records to create a new level of database content for future users of the computer program; and a downloading code segment that downloads the new level of database content.

\* \* \* \* \*